United States Patent [19]
Kent

[11] 3,711,360
[45] Jan. 16, 1973

[54] DECORATIVE PLASTICS STRIPS AND MOTIFS

[75] Inventor: Cecil Kent, Woking, England

[73] Assignee: Creators Limited, Woking, England

[22] Filed: April 16, 1970

[21] Appl. No.: 29,046

[30] Foreign Application Priority Data

April 22, 1969 Great Britain..................20,601/69
April 7, 1970 Great Britain..................16,524/70

[52] U.S. Cl. ..................161/44, 156/63, 156/244, 156/264, 156/268, 161/118, 161/119, 161/121, 161/123, 161/413

[51] Int. Cl..........................B32b 1/04, B32b 3/02

[58] Field of Search..........161/6, 37, 40, 41, 44, 118, 161/119, 121, 123, 145, 413; 40/136; 156/63, 250, 257, 258, 264, 266, 268, 306, 244; 52/623, 624, 312, 716–718

[56] References Cited

UNITED STATES PATENTS

| 3,046,174 | 7/1962 | Brooks | 161/145 X |
| 3,051,600 | 8/1962 | Markus et al. | 161/145 X |
| 3,086,216 | 4/1963 | Brooks et al. | 161/119 |
| 3,419,458 | 12/1968 | Brooks et al. | 161/121 |
| 2,471,576 | 5/1949 | Matzner | 161/118 |
| 3,013,919 | 12/1961 | Bialy | 161/119 UX |
| 3,024,147 | 3/1962 | Brooks et al. | 161/145 X |
| 3,458,386 | 7/1969 | Shanok et al. | 161/413 X |
| 3,471,355 | 10/1969 | Truesdell et al. | 161/40 |

FOREIGN PATENTS OR APPLICATIONS

| 634,465 | 3/1950 | Great Britain | 156/244 |
| 1,352,389 | 1/1964 | France | 161/119 |

*Primary Examiner*—William A. Powell
*Attorney*—Larson and Taylor

[57] ABSTRACT

This invention relates to decorative plastics strips and motifs suitable for securing by high frequency welding to a base surface. The decorative strip comprises an extruded plastics strip consisting of a central tape-like web portion along each side of which is a bead portion which projects above the front face of the web portion, each bead portion having a thin and narrow welding flange projecting outwardly from the back edge thereof in the plane of the web portion. A strip of material providing a desired decorative finish is bonded to the front face of the web portion. The decorative motif is in the form of a panel made by securing across each of the ends of a length of the twin-beaded strip, a piece of an auxiliary plastics strip material comprising a bead portion having the shape of one of the bead portions of the twin-beaded strip. The bead portions of the strips have a metallised finish or appearance.

6 Claims, 8 Drawing Figures

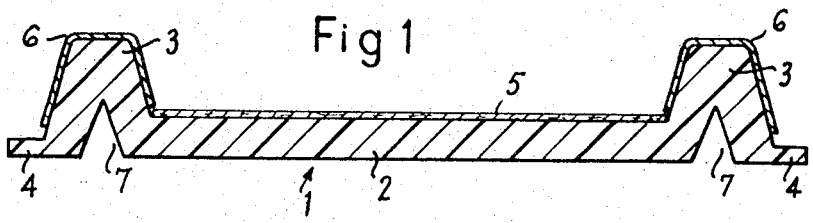
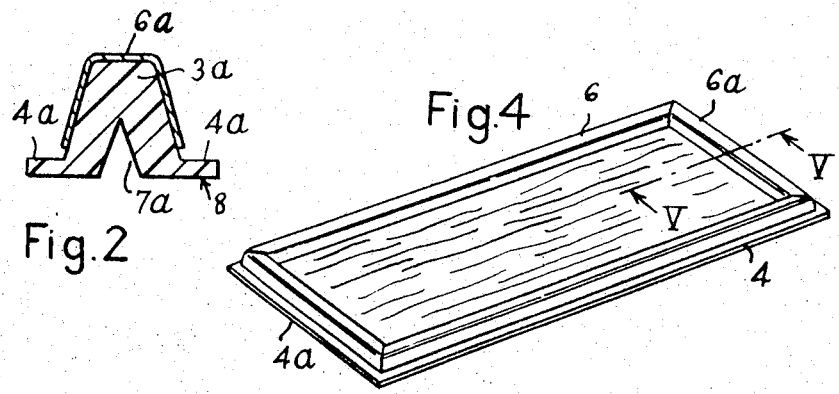
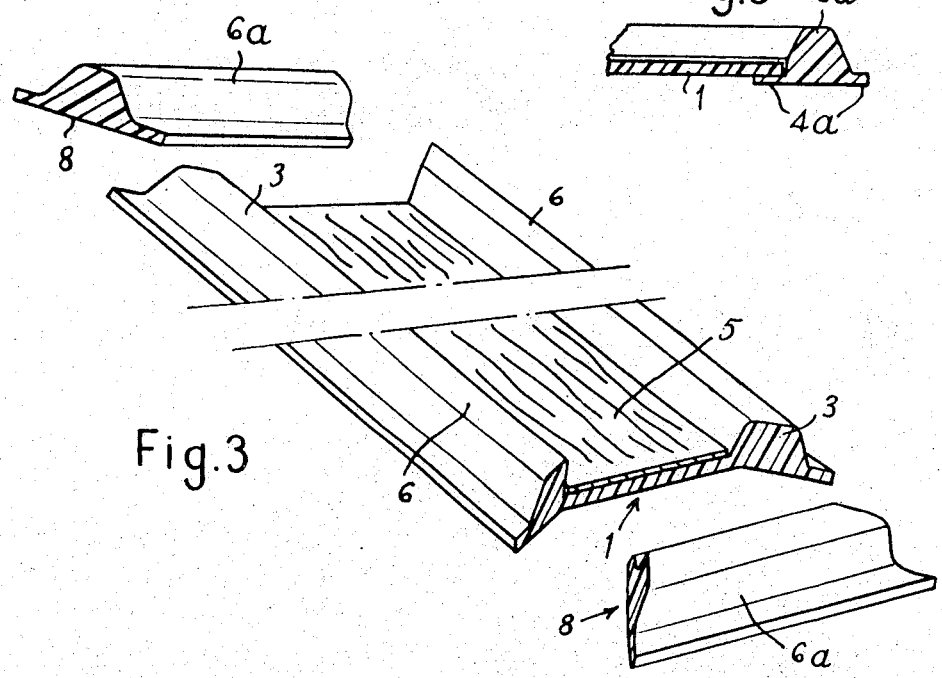

PATENTED JAN 16 1973

DECORATIVE PLASTICS STRIPS AND MOTIFS

The present invention relates to a decorative plastics strip suitable for securing by high frequency welding to a base surface, and which, in conjunction with auxiliary strips, can be used to make decorative motifs in the form of panels which can be similarly secured to a base surface by high frequency welding.

From one aspect, the present invention consists in a decorative plastics strip comprising an extruded plastics strip consisting of a central tape-like web portion along each side of which is a bead portion which projects above the front face of said web portion, each bead portion having a thin and narrow welding flange portion projecting outwardly from the back edge thereof in the plane of said web portion, said extruded plastics strip having bonded to the front face of said web portion a strip of material providing a desired decorative finish to said web portion, such as a strip of plastic printed with a wood grain or other desired finish, and each of said bead portions having a metallized finish or appearance.

The metallized finish is preferably provided by bonding strips of metallized transparent plastics foil along the surfaces of the bead portions.

From another aspect, the invention consists in a decorative motif in the form of a panel which is made from the twin-beaded decorative plastics strip by securing across each of the ends of a desired length thereof a piece of an auxiliary plastics strip material having the shape of one of said bead portions and provided with a metallized finish or appearance. The bead portions of the twin-beaded strip are mitred to the bead portions of the pieces of auxiliary strip material, which latter has thin and narrow welding flanges projecting outwardly in opposite directions from both rear edges of the bead portion thereof. The auxiliary strip pieces are conveniently secured to the ends of the piece of twin-beaded strip by welding the inwardly projecting welding flanges of the auxiliary strip pieces to the back of the web portion, either by high frequency or heat welding. Or the flanges may be stuck to the web portion. The finished motif panel has a welding flange extending entirely around its periphery.

In order to reduce the extent by which a flange of a piece of auxiliary strip welded to the back of the web portion projects behind the back of the web portion, either or both of the facing surfaces of the flange and the web portion may have grooves formed therein providing spaces for accommodating the softened plastics material as the flange is compressed during the welding operation.

The invention further consists in the method of making decorative motifs as above described.

In order that the invention may be more clearly understood, reference will now be made to the accompanying drawings, in which:

FIG. 1 is a section through one embodiment of a twin-beaded decorative plastics strip according to the invention.

FIG. 2 is a section through an auxiliary strip for use with the embodiment of FIG. 1.

FIG. 3 is an exploded perspective view of the pieces of twin-beaded and auxiliary strips used for making a motif.

FIG. 4 is a perspective view of the finished motif.

FIG. 5 is a scrap section on the line V—V in FIG. 4.

Figure 6:
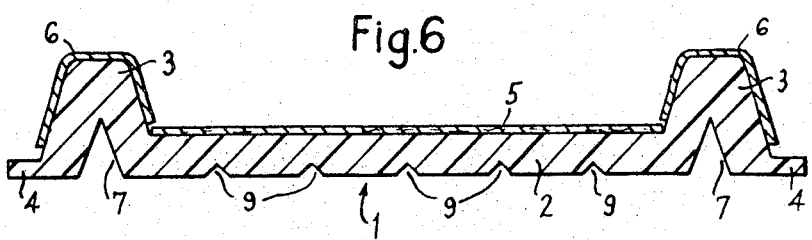
FIG. 6 is a section through a modification of the twin-beaded strip of FIG. 1.

Referring to the drawings, the twin-beaded decorative plastic strip is shown in cross-section in FIG. 1 and comprises an extruded plastics strip 1, conveniently of polyvinyl chloride, consisting of a central tape-like web portion 2 along each side of which is a bead portion 3 which projects above the front face of the web portion. Projecting outwardly from the rear edge of each bead portion is a narrow welding flange portion 4. Laminated to the front face of the web portion 1 is a decorative strip 5 which covers substantially the entire width of the web portion and which may be a strip of polyvinyl chloride printed or otherwise fabricated to simulate a wood grain or leathergrain finish. Bonded around the front of each bead portion is a metallized foil 6 conveniently comprising a strip of transparent plastics material, such as "Mylar" (Registered Trade Mark), the rear face of which is metallized with aluminum, the metallized layer being bonded to a layer of polyvinyl chloride which can be readily heat bonded to the PVC strip 1. The foils 6 and strip 5 may be bonded to the extruded plastics strip 1 as it leaves the extruder and is still hot. The under surfaces of the foils 6 and strip 5 may be heat softened, for example by hot air jets, as they are applied against the plastics strip 1 and may be pressed thereagainst by rollers to achieve firm bonds between the parts. The hot air jets may also soften the surface of the extruded plastics strip 1.

Preferably longitudinal grooves 7 are formed along the rear of the plastics strip directly behind the beads and extending thereinto as shown. The purpose of these grooves will be explained later.

Decorative plastics strips as described may be used for ornamentation by welding the strips by means of the welding flanges 4 to a base surface, such as the sheet plastic facing on the interior of a motor car door. The welding may be by high frequency, the welding tool being pressed down on to the flanges 4. The grooves 7 allow for lateral compression of the strip between the parallel welding electrodes and facilitate maintenance of the strip in the welding tool.

The decorative strip may also be used for making decorative motifs by securing against the ends of a desired length of the twin-beaded strip pieces of an auxiliary extrusion 8 having the cross-section shown in FIG. 2. This comprises an extrusion, preferably of PVC, comprising a bead like portion 3a corresponding to the shape of the bead portions 3 of the twin-beaded strip and having welding flanges 4a projecting outwardly from the rear edges at each side thereof. The rear of the extrusion is formed with a groove 7a and the front of the bead portion has a metallized foil 6a bonded thereto in the same way as the metallized foil 6 is bonded to the bead portions of the strip 1. The motif is constructed by cutting off a desired length of the twin-beaded strip, and mitering the ends of the bead portions thereof as shown in FIG. 3. Pieces of the auxiliary strip 8 are cut to the desired length and their ends are mitered as shown in FIG. 3. The inwardly facing flanges 4a of these end pieces are positioned beneath the ends of the web portion and are welded to the back of the strip 1 by high frequency welding, this operation reducing the thickness of the welded flanges 4a as shown in FIG. 5. FIG. 4 is a perspective view of the finished motif. It will be seen that welding flanges project around the entire motif and can be welded to a base surface by high frequency welding. The welding electrodes, in this case forming a rectangular frame, bear on the upper surfaces of the welding flanges and press them against the base surface to which the motif is to be welded. The counter-electrode of the welding system is positioned behind the base surface. The grooves 7, 7a enable the motif to be compressed to fit tightly within the electrodes of the welding tool. Preferably the extrusions 1 and 8 are made of transparent PVC.

Figure 7:
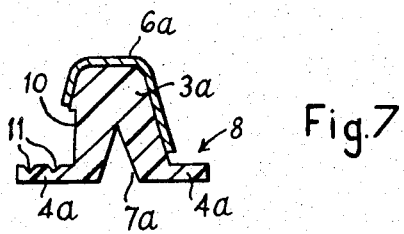
FIG. 7 is a section through a modified form of auxiliary strip.
Figure 8:
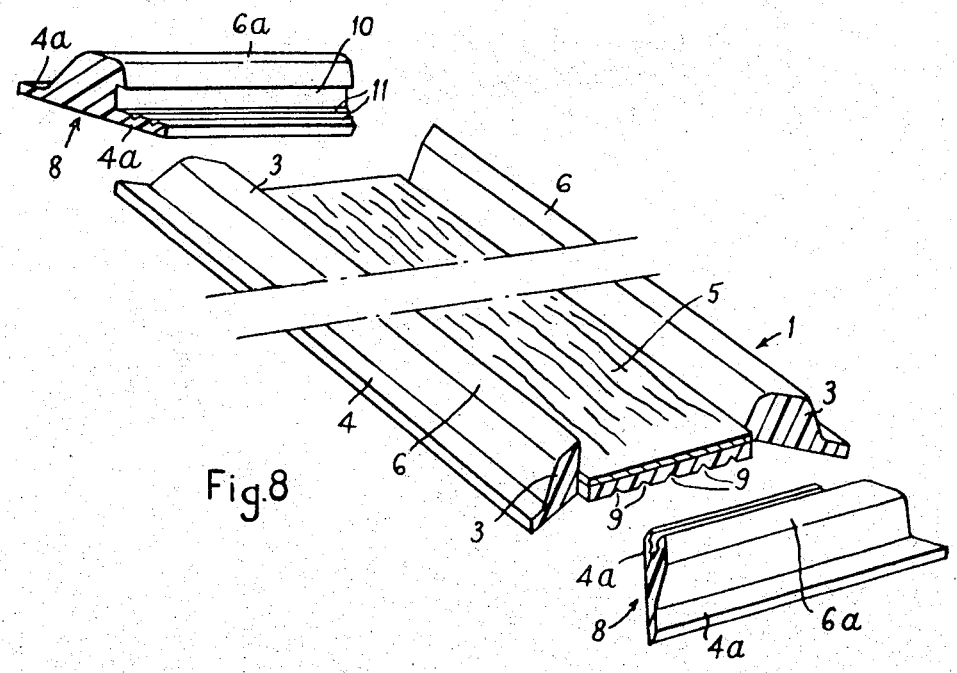
FIG. 8 is an exploded perspective view of the pieces of twin-beaded and auxiliary strips of FIGS. 6 and 7 used for making a motif.

In order further to reduce the extent by which a flange 4a, which is welded to the back of a strip 1, projects behind the back of the strip, the back of the web portion 2 of the strip and/or the flange 4a to be welded thereto may be provided with grooves. Such a modification is shown in FIGS. 6-8 in which like parts bear the same references as in the embodiment of FIGS. 1 to 5. As shown in FIGS. 6-8, the rear face of the web portion 2 is extruded with a series of longitudinal grooves 9 and the flange 4a of the auxiliary strip 3a to be welded thereto is provided along its upper surface with grooves 10. These two sets of grooves provide spaces for accommodating the softened plastics material as the flange 4a is compressed during the welding operation, thereby reducing the thickness of the flange material lying behind the back of the web 2 and improving the fixing of the motif to a flat backing surface.

The embodiment of FIGS. 6-8 also shows another modification for reducing or avoiding the occurrence of gaps between an auxiliary strip and the adjacent end of the web portion 2. To this end, the auxiliary strip 3a has a modified cross-section as shown in FIG. 7, the side which is to face inwardly of the motif being extruded with a longitudinal recess 11 of a height approximately corresponding to the thickness of the web portion 2 of the strip 1, so that by mitering the end of the strip 1 so that the end of the web portion 2 projects slightly beyond the inner ends of the miter, said projecting end of the web portion extends into the recess 11 of the auxiliary strip welded to that end of the strip 1, the extreme edge of the web portion 2 being covered by the overlying metallized bead portion 3a.

In one embodiment the web portion 2 may be about 0.055 inch thick, the welding flanges 4, 4a may be about 0.025 inch thick and the overall height of the bead portions may be 0.157 inch. The grooves 7 may be V-shaped grooves 0.078 inch deep and the grooves 9, if provided, may be right angled V-shaped grooves 0.020 inch deep. The width of the web portion may vary as desired.

While particular embodiments have been described it will be understood that various modifications may be made without departing from the scope of the invention. Thus the beads may be formed with a shape different from that shown. The decorative strip 5 may alternatively comprise a natural wood veneer of which the rear surface may, if necessary, be coated with PVC or other plastic or adhesive to secure a firm bond to the web portion. The motif may be embossed or printed with names or other devices.

I claim:
1. A decorative motif in the form of a panel comprising a length of twin beaded decorative strip comprising an extruded plastics strip comprised of a central tape-like web portion along each side of which is a bead portion which projects above the front face of said web portion, each bead portion having a thin and narrow welding flange portion projecting outwardly from the back edge thereof in the plane of said web portion, said extruded plastics strip having bonded to the front face of said web portion a strip of material providing a desired decorative finish to said web portion, and each of said bead portions having a metallized appearance, said twin-beaded strip having secured across each of the ends thereof a piece of an auxiliary plastics strip comprising a bead portion having the shape of one of said bead portions of the twin-beaded strip, said bead portion having a metallized appearance, and thin and narrow flanges projecting outwardly in opposite directions from both rear edges thereof, the bead portions of the twin-beaded strip being mitered to the bead portions of the pieces of auxiliary strip and the inwardly projecting flanges of each piece of auxiliary strip is bonded to the back of the web portion of the twin-beaded strip.

2. A decorative motif as claimed in claim 1, wherein each end of the web portion of the twin-beaded strip projects slightly beyond the inner edges of the mitered bead portions and extends into a recess, of a height approximately corresponding to the thickness of the web portion, along the inwardly facing side of the bead portion of the associated piece of auxiliary strip.

3. A decorative motif as claimed in claim 1, wherein the inwardly projecting flanges of the pieces of auxiliary strip used in making the motif are formed with grooves in the upper surfaces thereof.

4. A decorative motif as claimed in claim 3, including a plurality of grooves along the rear of the web portion of the twin-beaded strip, a longitudinal groove along the rear of the twin-beaded strip directly behind each bead portion and extending thereinto; and strips of metallized transparent foil bonded along the surfaces of the bead portions of the twin-beaded and auxiliary strips; and wherein the strip of decorative material bonded to the front face of the web portion of the twin-beaded strip is of plastics material printed with a desired finish and covers substantially the entire width of the web portion; and wherein each end of the web portion of the twin-beaded strip projects slightly beyond the inner edges of the mitered bead portions and extends into a recess, of a height approximately corresponding to the thickness of the web portion, along the inwardly facing side of the bead portion of the associated piece of auxiliary strip.

5. The method of making a decorative motif in the form of a panel, comprising the steps of fabricating a twin-beaded decorative plastics strip comprised of a central tape-like web portion along each side of which is a bead portion which projects above the front face of said web portion, each bead portion having a thin and narrow welding flange portion projecting outwardly from the back edge thereof in the plane of said web portion, said extruded plastics strip having bonded to the front face of said web portion a strip of material providing a desired decorative finish to said web portion, and each of said bead portions having a metallized appearance, fabricating a strip of auxiliary plastics material comprising a bead portion having the shape of one of said bead portions of the twin-beaded strip, said bead portion having a metallized appearance, and thin and narrow flanges projecting outwardly in opposite directions from both rear edges of the bead portion, cutting off a desired length of the twin-beaded strip, mitering the ends of the bead portions thereof and cutting off the ends of the web portion between the mitered ends of the bead portions, cutting pieces of the auxiliary strip and mitering their ends so as to fit between the mitered ends of the bead portions of the twin-beaded strip, and then positioning the pieces of auxiliary strip across the ends of the twin-beaded strip with their inwardly facing flanges beneath the ends of the web portion and bonding said flanges to the back of the web portion.

6. The method as claimed in claim 5, wherein the twin-beaded and auxiliary strips are fabricated with grooves along the back of the web portion and the upper surface of the flange which is to project inwardly of the motif respectively, and the inwardly facing flanges of the pieces of auxiliary strip are welded to the back of the web portion of the twin-beaded strip under pressure to cause part of the softened plastics material to flow into the grooves as the flange is compressed during the welding operation.

* * * * *